INVENTOR:
KARL F. ROSS

INVENTOR:
KARL F. ROSS

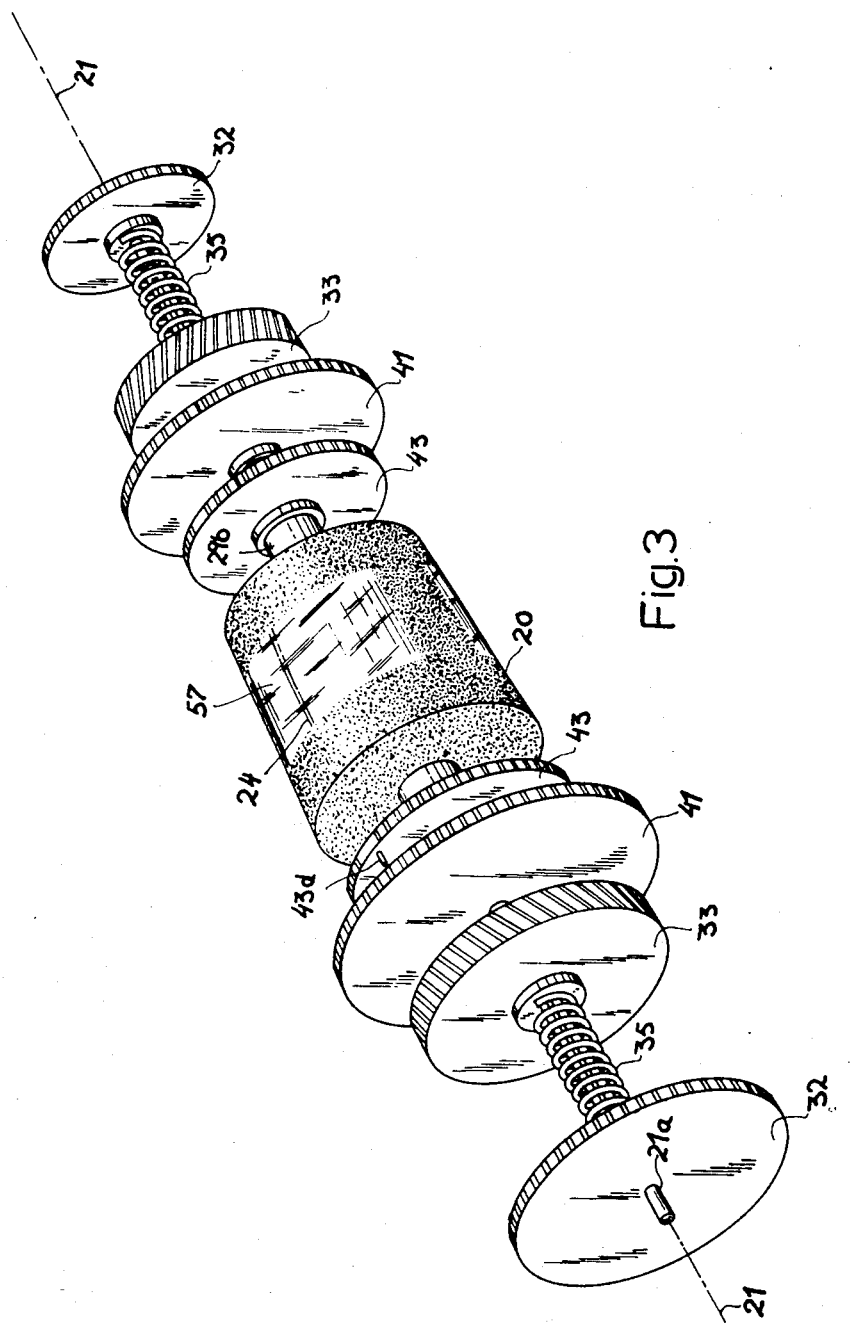

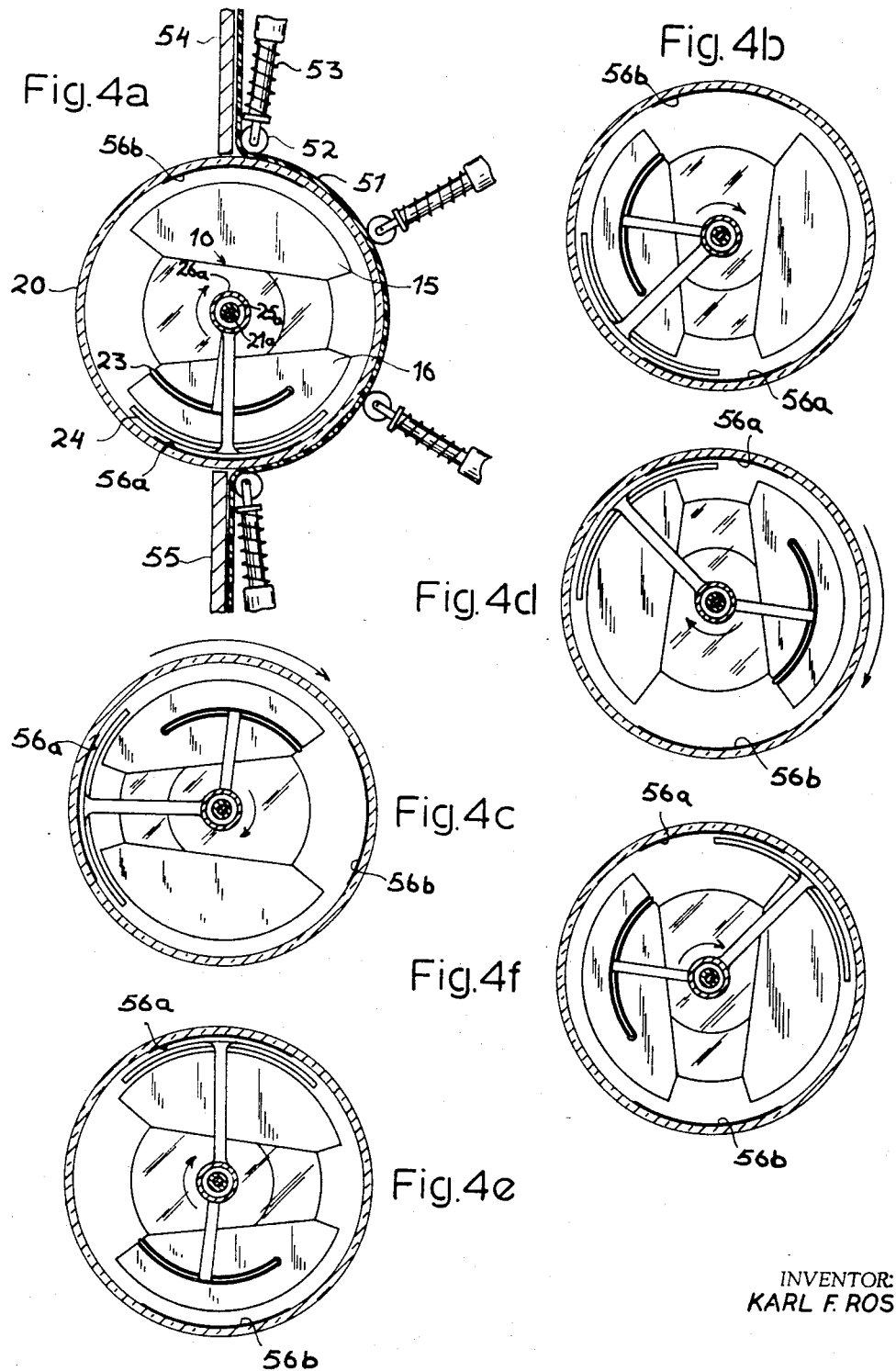

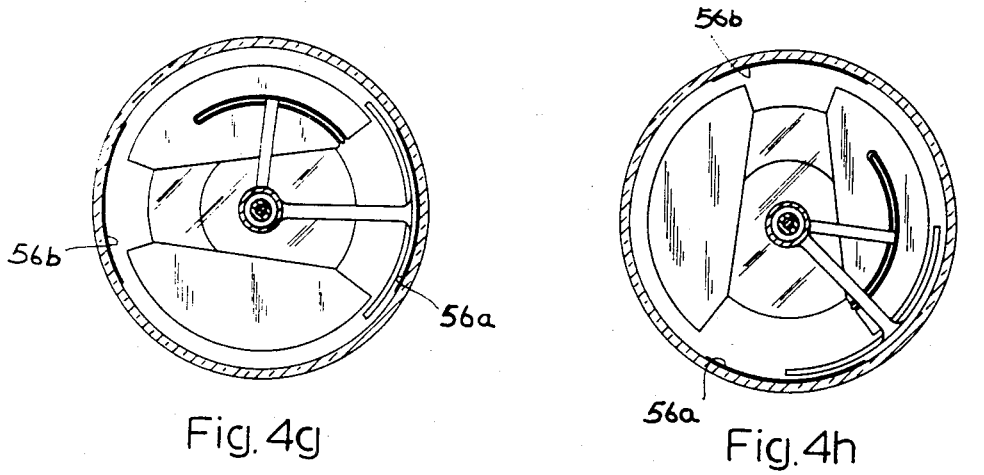
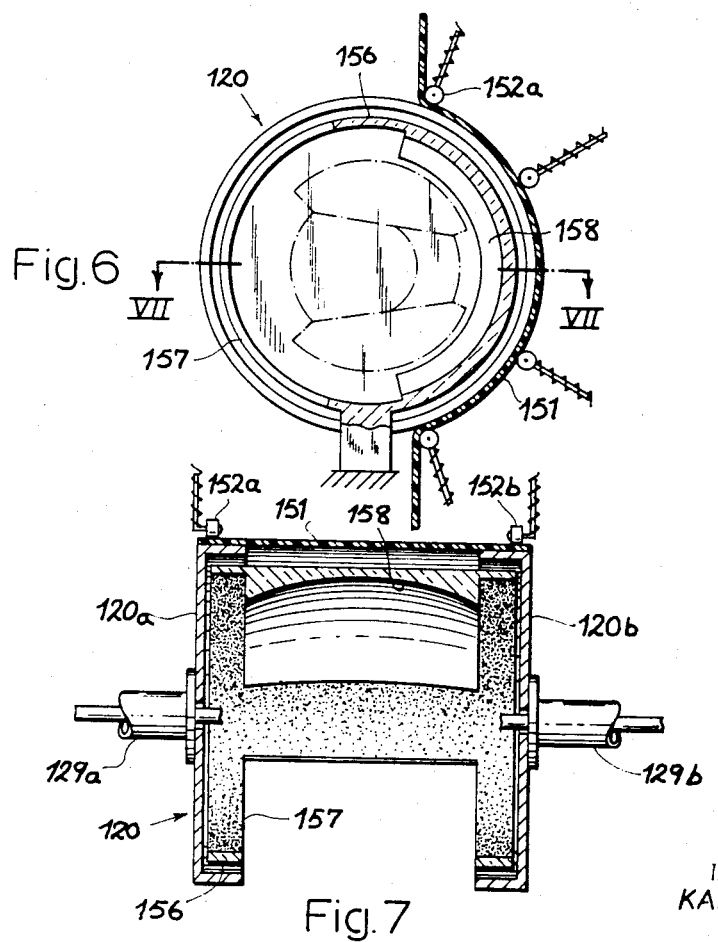

INVENTOR:
KARL F. ROSS

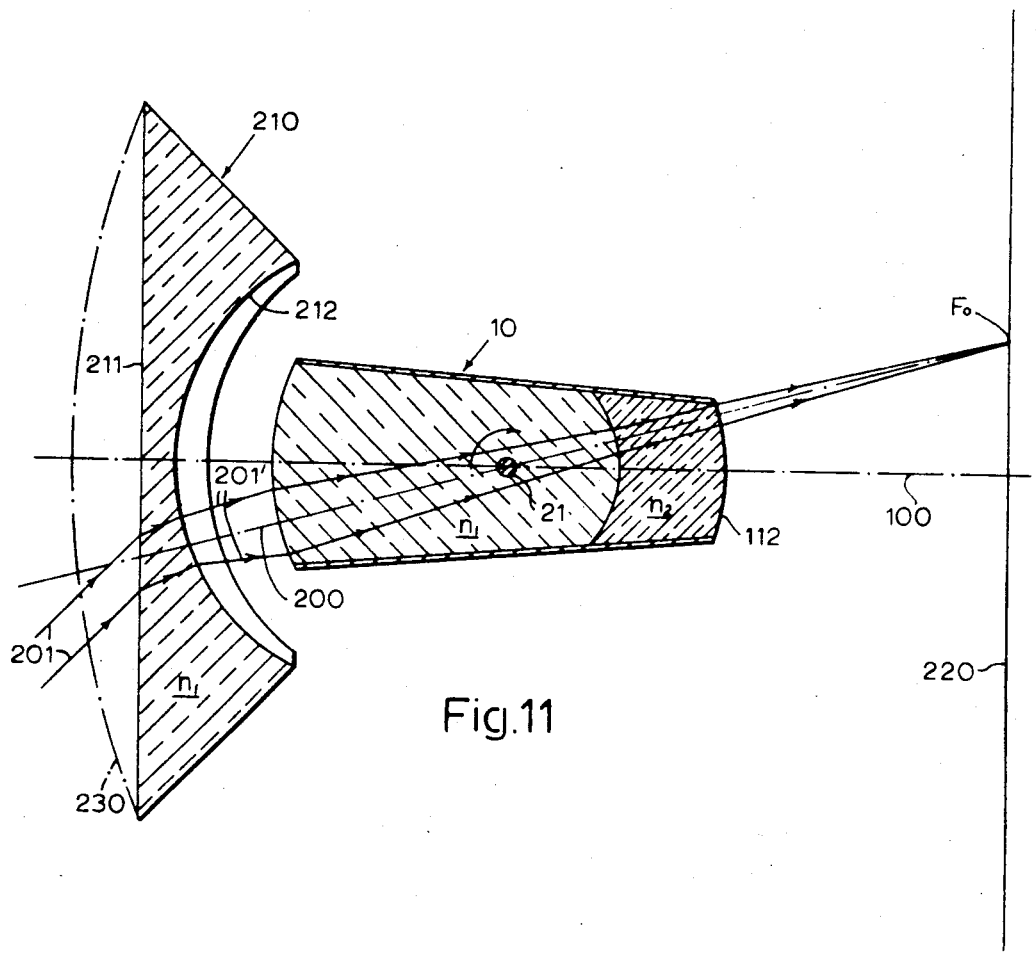

United States Patent Office 3,362,770
Patented Jan. 9, 1968

3,362,770
DIOPTRIC COMPONENT CONSISTING OF AT LEAST TWO CONCENTRICALLY CURVED MEMBERS
Karl F. Ross, 5121 Post Road, Bronx, N.Y. 10471
Original application Oct. 21, 1963, Ser. No. 317,724, now Patent No. 3,302,543, dated Feb. 7, 1967. Divided and this application Oct. 24, 1965, Ser. No. 515,281
14 Claims. (Cl. 350—230)

ABSTRACT OF THE DISCLOSURE

Dioptric component, adapted to be rotated about an axis for wide-angle imaging, wherein all the outer and inner surfaces are bounded in the plane of rotation by arcs centered on that axis, one of these members being biconvex and bounded by an outer surface of relatively large radius and an internal surface of relatively small surface, the other member being concavo-convex and bounded by the same internal surface and another outer surface of larger radius; the refractive index of the second member exceeding that of the first member so as to make the internal surface negatively refracting.

---

This application is a division of my copending application Ser. No. 317,724, filed Oct. 21, 1963, now Patent No. 3,302,543.

My present invention relates to a dioptric system of the type using a lens or lens combination whose optically effective surfaces are all centered on a common point or axis. Lenses of this character have been disclosed in U.S. Patents Nos. 2,923,220 and 3,044,379, issued Feb. 2, 1960, and July 17, 1962, to A. Bouwers.

Lenses with concentric or coaxial surfaces (for spherical or cylindrical refractivity, respectively) are particularly suitable for wide-angle or panoramic picture taking or projection, owing to the fact that rays incident at a variety of angles can be sharply focused; they also offer the designer the advantage that their principal points coincide with the center of curvature so that the focal length of any such lens, whether simple or compound, is always measured from that center. (In the present context, compound lenses are those whose internal refractive surfaces are concentric or coaxial with the outer lens surfaces.) As is the case with other lenses of circular curvature, however, these lenses provided satisfactory image definition only over a limited field angle for each direction of incidence since only the so-called paraxial rays, i.e., those passing through the lens center or in the immediate vicinity thereof, will focus sharply. It has, therefore, been necessary in the past to provide various types of diaphragms for limiting the effective field angle, with a resultant reduction in the relative aperture of the lens.

An object of my invention is to provide an improved lens of this type in which the field of converging rays is widened so that larger relative apertures may be used.

Another object of my invention is to provide means for increasing the luminous intensity of a concentric or coaxial objective of given design.

A further object of my instant invention is to provide means for effectively flattening the image plane of a spherical or cylindrical objective of the concentric or coaxial type.

It is also an object of the instant invention to provide a high-speed, wide-angle, substantially achromatic dioptric component for photographic and related optical systems.

In the following description I shall generally refer to concentric surfaces, it being understood that—unless otherwise noted—the term is intended to encompass both spherical and cylindrical lens surfaces.

It will be convenient to designate by $R_1$ the radius of curvature of the front surface of a lens to be discussed (i.e., the surface on the side of the incident or longer light rays), by $R_3$ the radius of the opposite or rear surface, and by $R_2$ the radius of any concentric cemented surface therebetween. Furthermore, let $$\left|\frac{R_1}{R_2}\right| \equiv K_1 \text{ and } \left|\frac{R_1}{R_3}\right| \equiv K_2$$

it being assumed that $R_1$ is positive and $R_2$, $R_3$ are negative according to conventional notation. Also, the lens portion limited by the surfaces $R_1$ and $R_2$ shall have a refractive index $n_1$ whereas the lens portion limited by the surfaces $R_2$, $R_3$ shall have an index $n_2 > n_1$.

It can be shown that the focal length $f$ of a lens so defined is given by the expression $$f = \frac{R_1}{E - K_2} = R_3 \frac{K_2}{E - K_2} \quad (1)$$

where $$E \equiv \frac{1 + K_1}{n_1} - \frac{K_1 - K_2}{n_2} - 1 \quad (2)$$

The back-focal length $f_b$ is then given by $$f_b = R_3 \frac{E}{E - K_2} \quad (3)$$

and should have a positive value if an object at infinity is to form a real image at a location beyond the lens. Since the internal radius $R_2$ of the doublet must be smaller than its external radius $R_3$, it is necessary that $K_1 > K_2$ so that, for $E > 0$, $K_1 > n_1 - 1$.

In a conventional spherical or cylindrical lens lacking a cemented surface, i.e. a singlet, $$|R_1| = |R_3| = R \text{ and } n_1 = n_2 = n$$

$R_2$ being of indeterminate value owing to the uniformity of the glass. In this case the formula for the back-focal length reduces to $$f_b = R \frac{2 - n}{2(n - 1)} \quad (3a)$$

With such a lens, in which $K_2 = K = 1$, the back-focal distance $s''$ for rays with increasing angle of incidence $\alpha$ decreases rather sharply from the value $s_0 = f_b$ which is valid for $\alpha = 0$. I have found, in accordance with this invention, that the relationship $s'' \approx f_b$ may be maintained over a relatively wide range of $\alpha$ if the value of $K_2$ is close to unity and, preferably, ranges between approximately 0.9 and 1.1. The value of $K_1$ may be roughly equal to $2K_2$, being advantageously held approximately to the range $2 \geqslant K_1 \geqslant 1.8$ in order to establish a relatively wide entrance pupil.

Another feature of my invention resides in the provision of means for rotating a lens of this description about an axis passing through its center of curvature, at least the front surface of the lens being limited in the plane of rotation to a circular arc subtending an angle not greater than that from which sharp definition of the image is obtainable. As the lens rotates, different portions thereof focus the same incident rays upon a given point of a concentric receiving surface so that this point is exposed to more light than would be the case if the lens were stationary. Owing to the perfect circularity of each concentric lens surface, the point of convergence of the rays from a given distant object does not change as the lens rotates. In this manner the need for a special diaphragm to restrict the effective field angle is avoided, it being however possible to reduce this field angle selectively by the provision of an adjustable light shield if the luminous intensity of the objective is to be decreased in view of existing light conditions. It will be understood that the rotation of the segmental lens need not be continuous and unidirectional but may consist of alternate sweeps in opposite directions if desired.

The above-described rotatable system affords a wide angle of view in one plane and, for proper projection, requires that the sensitive film or other receiving surface (e.g., a ground-glass plate used for visual observation) be curved about the axis of rotation in that plane. In some instances, e.g., with panoramic cameras, the dimension of the projected image transverse to the plane of rotation may be so small that the field curvature is negligible; if it is not, a conventional flattening lens (e.g., as known from the aforementioned Bouwers Patent No. 3,044,379) may be fixedly interposed between the film and the concentric lens or may be rotatable with the latter. In accordance with a more specific feature of my invention, however, I may provide a circular flattening lens adapted to be placed in front of the (rotating or stationary) concentric lens, the parameters of the flattening lens being so chosen that the value of $f_b$ changes proportionally to the secant of the angle of incidence so that the resulting image surface will be a plane.

The invention will be described in greater detail with reference to the accompanying drawing in which:

FIG. 3 is a perspective view of an exposure system including means for rotating the lens of FIG. 1 in the taking of wide-angle pictures;

FIGS. 4a–4h are cross-sectional views through the system of FIG. 3 in eight successive operating positions;

FIG. 6 is a cross-sectional view of a modified film carrier for an exposure system using the lens of FIGS. 1 and 3;

FIG. 7 is a sectional view taken on the line VII—VII of FIG. 6;

FIG. 11 shows the combination of a lens similar to that of FIG. 1 with a special flattening front lens therefor;

Figure 1:
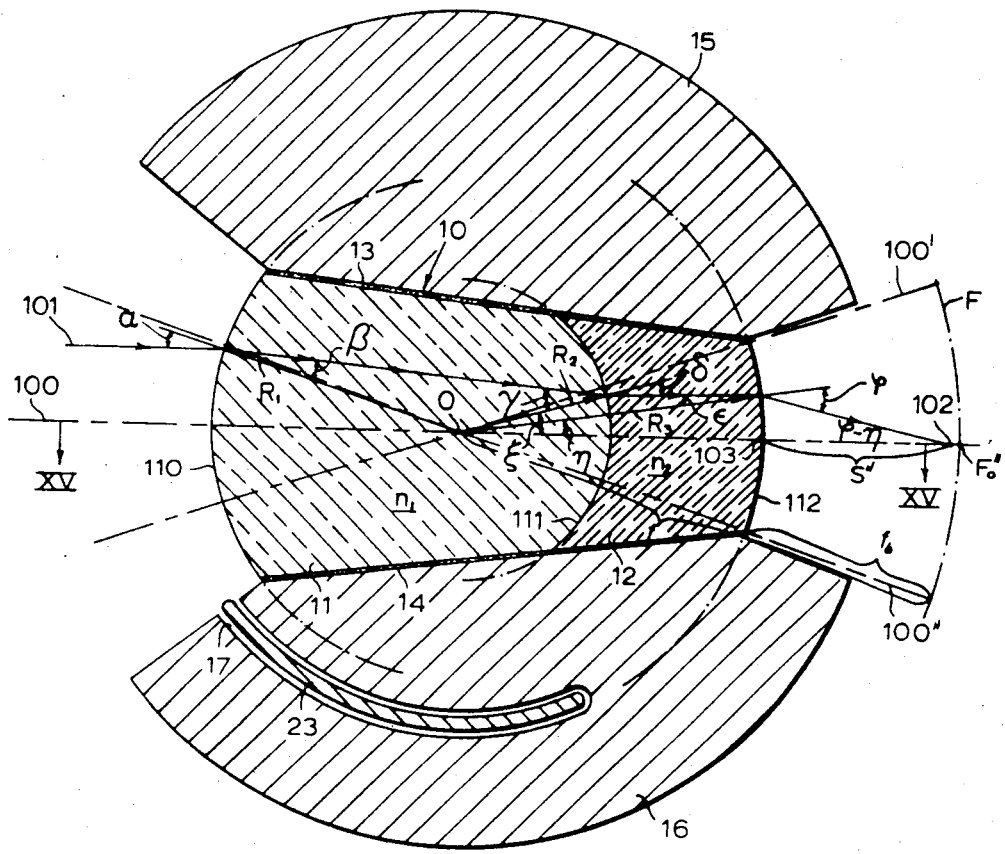
FIG. 1 is a cross-sectional view of a concentric lens according to the invention.

Reference will first be made to FIG. 1 for a discussion of the properties of a lens adapted to be used in a wide-angle exposure system according to this invention, it being understood that the lens could also be used in a projector by simple inversion of the direction of the light rays as is well known.

The lens 10 shown in FIG. 1 is a doublet composed of a positively refracting first member 11 and a negatively refracting second member 12. Member 11 has a refractive index $n_1$ and is bounded by a front surface of radius $R_1$ and an internal surface of radius $R_2$ along which it is cemented onto member 12; the latter has as its front boundary the cemented surface of radius $R_2$ and as its rear boundary an outer surface of radius $R_3$. All the radii are measured from a point O serving as the common center of the surfaces referred to.

For the present, only the cross-section of the lens visible in FIG. 1 is to be considered. In its transverse plane the lens 10 may have the cross-section illustrated in FIG. 15 where its front and internal surfaces are shown to have the same radii $R_1$ and $R_2$ (being thus segments of concentric spheres) whereas the rear surface has an aspherical configuration more fully described hereinafter. In some instances, however, all the lens surfaces may be spherical, e.g., in the event that the lens 10 is used together with one of the flatteneng lenses described hereinbelow.

As shown in FIG. 1, $R_1$ is positive, $R_2$ is negative and smaller than $R_1$ so that $$K_1 \equiv \left|\frac{R_1}{R_2}\right| > 1$$

and $R_3$ is negative and larger than $R_1$ so that $$K_2 \equiv \left|\frac{R_1}{R_3}\right| < 1$$

It is also assumed that $n_1$ is smaller than $n_2$ in order that lens member 12 may be of dispersive character. The axial thicknesses of the members 11 and 12 are $$|R_1| + |R_2| \text{ and } |R_3| - |R_2|$$

respectively.

The axis 100 passes through the center O and lies at the intersection of two mutually perpendicular planes of symmetry of the lens. At 101 a light ray parallel to axis 100 impinges on the front surface 110 of lens member 11, including an angle $\alpha$ with the radius $R_1$ thereof. Upon refraction, the ray continues inside lens member 11 at an angle $\beta$ with reference to radius $R_1$ and strikes the internal surface 111 between lens members 11 and 12 at an angle $\gamma$ with reference to its radius $R_2$. This internal surface, being negatively refracting, further deflects the ray so that its angle with radius $R_2$ within member 12 will have the value $\delta$. As the ray strikes the rear surface 112 of member 12, it includes with the radius $R_3$ of that surface an angle $\epsilon$ which changes to $\varphi$ as the ray emerges after further refraction. If $\xi$ and $\eta$ are the angles which the radii $R_2$, $R_3$ respectively include with axis 100, the emerging ray approaches this axis at an angle $\varphi - \eta$ and intersects it at a point 102 which, for small values of $\alpha$, is in the vicinity of point $F_0''$ representing the focal point of the lens on axis 100. The distance $s''$ between point 102 and the rear vertex 103 of the lens along axis 100 is thus substantially equal to the back-focal length $f_b$ of the lens measured between this vertex and focal point $F_0''$. It will be apparent that, owing to the circularity of the lens surfaces, other focal points will exist which have the same distance $f_b$ from the rear lens surface 112 and which lie on other axes passing in different directions through the center O, such as the axes 100' and 100''. The locus of all these focal points is the curve F which is a circular arc of radius $f$ centered on O, $f$ being the focal length of the system.

In accordance with the laws of geometry and optical refraction it can be shown that the following relationships obtain:

$$\sin \beta = \frac{\sin \alpha}{n_1} \quad (4)$$

$$\sin \gamma = \frac{R_1 \sin \alpha}{R_2 n_1} = K_1 \sin \beta \quad (5)$$

$$\sin \delta = \frac{R_1 \sin \alpha}{R_2 n_2} = \frac{n_1 \sin \gamma}{n_2} \quad (6)$$

$$\sin \epsilon = \frac{R_1 \sin \alpha}{R_3 n_2} = \frac{K_2 \sin \delta}{K_1} \quad (7)$$

$$\sin \varphi = \frac{R_1 \sin \alpha}{R_3} = n_2 \sin \epsilon \quad (8)$$

$$\xi = \beta + \gamma - \alpha \quad (9)$$

$$\eta = \xi + \epsilon - \delta = \beta + \gamma - \alpha - \delta + \epsilon \quad (10)$$

As will be readily apparent from FIG. 1, point 102 is separated from center O by a distance $$R_3 + s'' = R_3 \cos \eta + R_3 \frac{\sin \eta}{\tan (\varphi - \eta)} \quad (11)$$

For small values of $\alpha$ we can write:

$$\varphi \approx \sin \varphi = K_2 \sin \alpha \approx K_2 \alpha \quad (8a)$$

and $$\eta \approx \frac{\alpha}{n_1} + \frac{K_1 \alpha}{n_1} - \alpha - \frac{K_1 \alpha}{n_2} + \frac{K_2 \alpha}{n_2} = E\alpha \quad (10a)$$

where $$E \equiv \frac{1 + K_1}{n_1} - \frac{K_1 - K_2}{n_2} - 1 \quad (2)$$

Thus, with $\sin \eta \approx \eta$ and $\tan (\varphi - \eta) \approx \varphi - \eta$, we can simplify Equation 11 for paraxial rays to obtain $$R_3 + s'' = R_3 \left(1 + \frac{\eta}{\varphi - \eta}\right) \approx R_3 \left(1 + \frac{E}{K_2 - E}\right) \quad (11a)$$

whence, for $\alpha = 0$, $$s_0'' \equiv f_b = R_3 \frac{E}{K_2 - E} \quad (3)$$

The lens 10 is shown bounded along its sides by rearwardly converging opaque strips 13, 14 of nonreflecting character. The separation of these strips, i.e., the thickness of the lens in the plane seen in FIG. 1, is so selected that the arcs intercepted by them on the entrance and exit surfaces 110, 112 of the lens are limited to regions within which $s'' \approx f_b$. When the lens is rotated about its center O, its axis 100 together with the field defined by the limiting rays 100', 100" ($\alpha = \pm \alpha_{max}$) will sweep across the surface F through an angle which may be much larger than $2\alpha_{max}$ and in practice may approach 180°. In specific cases, e.g., with slanted incident rays as shown in the two Bouwers patents, referred to, the angle of exposure and projection may be extended to a full 360°.

Two opaque segmental bodies 15 and 16 are secured to the lens 10 outside its surfaces 13 and 14 to block the passage of stray light rays when the lens is rotated about a transverse axis through point O as described hereinafter with reference to FIGS. 3–5. Segment 16 is formed with a slot 17 adapted to receive an arcuate light shield 23 which is adjustable with reference to the lens as likewise more fully described hereinafter.

Since, from Equations 4 and 5, $$\sin \gamma = \frac{K_1 \sin \alpha}{n_1}$$

the value of $\alpha_{max}$ is also determined from the relationship $$\sin \alpha_{max} = \frac{n_1}{K_1} \quad (12)$$

inasmuch as $\sin \gamma$ cannot be larger than unity. This is further borne out by inspection of FIG. 1 which shows that a considerable reduction of $R_2$ below the magnitude illustrated would require a sharper convergence of the lens sides 13 and 14 with the result that some of the rays incident upon the front surface of the lens would strike these sides before reaching the cemented surface. With $n_1 = 1.5$, for example, $\alpha_{max}$ could not be substantially greater than 45° if $K_2 = 2$, regardless of any improvement in the deviation of $s''$ from $f_b$ that may be effected by suitable selection of the other parameters of the system.

Figure 2:
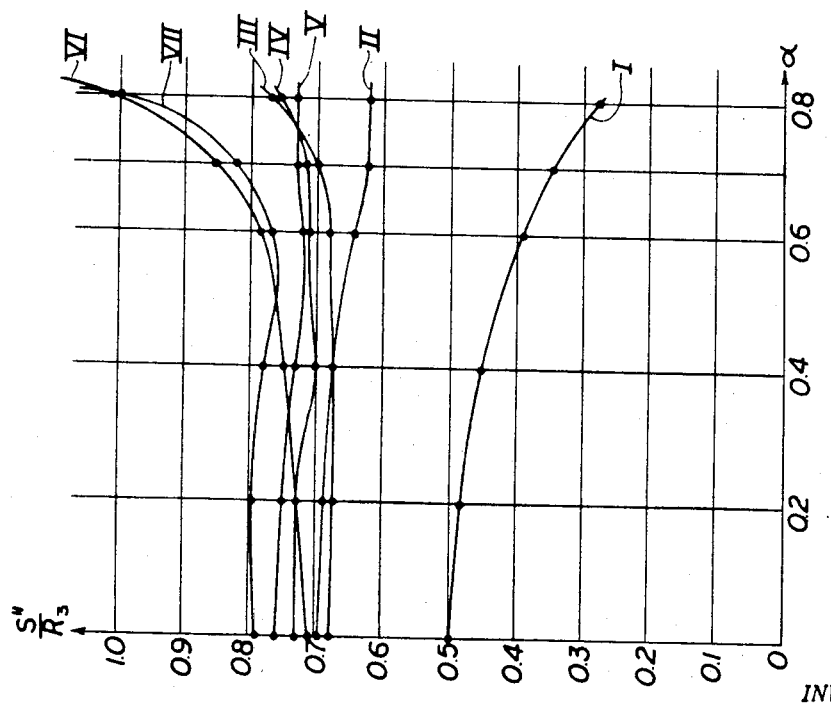
FIG. 2 is a set of graphs illustrating the changes in relative image distance $s''/R_3$ with increasing angles of incidence $\alpha$ as plotted for different parameters of the lens shown in FIG. 1.

In FIG. 2 I have shown a series of Graphs II to VII in which $s''/R_3$ has been plotted against $\alpha$ for different values of $K_1$ and $K_2$. Curve I, included for purposes of comparison, relates to a homogeneous spherical lens wherein $R_1 = R_3 = R$ (there being no internal refractive surface of radius $R_2$) and $n_1 = n_2 = 1.5$, the ratio $f_b/R$ being computed as 0.5. It will be noted that the value of $s''/R_3$ drops at a steadily increasing rate with rising values of $\alpha$. Curves II to VII, on the other hand, apply to lenses of the type illustrated in FIG. 1 having the following parameters:

TABLE A

| Curve | $n_1$ | $n_2$ | $K_1$ | $K_2$ | $f_b/R_3$ | $\alpha_{max}$ |
|---|---|---|---|---|---|---|
| II | 1.5 | 1.75 | 1.8 | 1 | 0.696 | 0.99 |
| III | 1.5 | 1.75 | 1.9 | 0.9 | 0.68 | 0.9 |
| IV | 1.5 | 1.75 | 1.9 | 1 | 0.725 | 0.9 |
| V | 1.5 | 1.75 | 1.9 | 1.1 | 0.76 | 0.9 |
| VI | 1.5 | 1.75 | 2 | 0.925 | 0.715 | 0.84 |
| VII | 1.5 | 1.75 | 2 | 1.1 | 0.795 | 0.84 |

It will be seen from FIG. 2 that, for values of $K_1$ and $K_2$ in the vicinity of 2 and 1, respectively, the value of $s''/R_3$ remains substantially constant for angles of incidence $\alpha$ up to approximately 0.6 and above. It is interesting to note that, for higher values of $\alpha$, the curve tends to droop when $K_1$ is small and/or $K_2/K_1$ is large (Curves II and V) but tends to rise when the situation is reversed (Curves III, VI, VII). Particularly good results are observed with $K_1 \approx 1.9$ ranging within about ±10% of unity, as is true of the systems represented by Curves III, IV and V; the last-mentioned curve has exceptional flatness up to and beyond $\alpha = 0.8$.

The indicated values for $n_1$ and $n_2$ are not critical but have been chosen near the lower and upper limits of the range of available refractive indices; if the difference between $n_1$ and $n_2$ is materially reduced, the lens begins to approximate a homogeneous one with the characteristic illustrated by Graph I in FIG. 2.

In accordance with Equation 12 the field of view is limited by the value of $K_1$ to an angle $\alpha_{max}$ as given in the foregoing table. Thus, $K_1$ cannot be substantially greater than 2 if a field close to 90° is desired.

With the listed values for $n_1$ and $n_2$, E as derived from Equation 2 assumes the value $$\frac{2K_1 - 7 + 12K_2}{21}$$

whence, according to Equation 3, $$\frac{f_b}{R_3} = \frac{12K_2 + 2K_1 - 7}{9K_2 - 2K_1 + 7}$$

in order that both E and $f_b/R_3$ be positive, $K_2$ (which of course must be smaller than $K_1$) has to be greater than ¼ for $K_1 = 2$ and greater than ⅓ for $K_1 = 1.5$. Actually, the lower limit of $K_2$ is also determined by the requirement that $\xi$ and $\eta$, as given in Equations 9 and 10, be greater than zero for all angles of incidence up to $\alpha_{max}$; under the assumed conditions of refractivity it then becomes necessary that, e.g., for a field of view encompassed by $\alpha_{max} = \pm 1$, $K_2 > 0.47$ if $K_1 = 1.5$. In practice it will usually be desirable to make $f_b$ equal to a major fraction of $R_3$, preferably upwards of about $R_3/2$, which imposes further limitations upon the range within which $K_2$ can be varied; thus, with $K_1 = 1.8$ and a field of view as stated above, $K_2$ must be chosen greater than 0.72 if the back-focal length is to exceed half the radius of the rear surface 112 of the lens.

The Equation 3 for the back-focal length may also be written in the form $$\frac{f_b}{R_3} = \frac{K_2 n_1 + K_1(n_2 - n_1) - n_2(n_1 - 1)}{n_1 K_2(n_1 - 1) - K_1(n_2 - n_1) + n_2(n_1 - 1)} \quad (3b)$$

which is more convenient for calculating the dispersion factors $\nu_1$, $\nu_2$ of the two cemented lens members 11, 12 that may be used in order to make the lens 10 substantially achromatic. For this purpose it will be assumed that the value of $$\nu = \frac{n_d - 1}{n_f - n_c}$$

is proportional to $$\frac{n_d - 1}{n_d - n_c}$$

for the optical glasses considered, with $n_d - n_c \equiv \Delta \gg n_d$, so that $$\frac{\nu_1}{\nu_2} = \frac{\Delta_2(n_1 - 1)}{\Delta_1(n_2 - 1)} \quad (13)$$

If, now, the refractive power of the lens 10 is to be the same for light rays of the D line and of the C line of the spectrum, then Equation 3b must be valid not only for $n_1 \equiv n_{d1}$ and $n_2 \equiv n_{d2}$ but also for $n_1 - \Delta_1 = n_{c1}$ and $n_2 - \Delta_2 = n_{c2}$. Hence, $$\frac{K_2 n_1 + K_1(n_2 - n_1) - n_2(n_1 - 1)}{n_1 K_2(n_2 - 1) - K_1(n_2 - n_1) + n_2(n_1 - 1)} = \frac{K_2(n_1 - \Delta_1) + K_1(n_2 - n_1 - \Delta_2 + \Delta_1) - (n_2 - \Delta_2)(n_1 - \Delta_1 - 1)}{(n_1 - \Delta_1) K_2(n_2 - \Delta_2 - 1) - K_1(n_2 - n_1 - \Delta_2 - \Delta_1) + (n_2 - \Delta_2)(n_1 - \Delta_1 - 1)} \quad (14)$$

which, if one neglects the second-order terms $\Delta_1{}^2$, $\Delta_2{}^2$ and $\Delta_1, \Delta_2$, can be rewritten as $$\frac{K_2 \Delta_1 - K_1(\Delta_2 - \Delta_1) - \Delta_2(n_1 - 1) - \Delta_1 n_2}{K_2[\Delta_1(n_2 - 1) + \Delta_2 n_1] - K_1(\Delta_2 - \Delta_1 + \Delta_2(n_1 - 1)) + \Delta_1 n_2} =$$

$$\frac{K_2 n_1 + K_1(n_2 - n_1) - n_2(n_1 - 1)}{n_1 K_2(n_2 - 1) - K_1(n_2 - n_1) + n_2(n_1 - 1)} \equiv \frac{D}{N} \quad (15)$$

reducing to $$_1\{(K_2 - K_1 - n_2)D - [K_2(n_2 - 1) + K_1 + n_2]N\} = \Delta_2[(K_2 n_1 - K_1 + n_1 - 1)N - (K_1 - n_1 + 1)D] \quad (16)$$

Given the values of $n_1$, $n_2$, $K_1$ and $K_2$, we can compute $\Delta_2/\Delta_1$ from Equation 16 and, from Equation 13, the ratio $\nu_1/\nu_2$ can be calculated. Following are several representative values:

TABLE B

| $n_1$ | $n_2$ | $K_1$ | $K_2$ | $\Delta_2/\Delta_1$ | $\nu_1/\nu_2$ |
|---|---|---|---|---|---|
| 1.5 | 1.75 | 1.9 | 1.1 | 5 | 3.33 |
| 1.5 | 1.75 | 1.9 | 0.9 | 4.04 | 2.69 |
| 1.5 | 1.75 | 2 | 1 | 4.1 | 2.74 |
| 1.5 | 1.75 | 2 | 0.925 | 3.72 | 2.48 |

The first, second and fourth lines of the foregoing Table B correspond to Curves V, III and VI of Table A, respectively. It will be seen that the dispersion ratio of the two glasses decreases generally inversely with the ratio $K_1/K_2$, the requirement for achromatism being thus more easily satisfied with parameters which do not afford optimum focusing over the largest field of view. Curve III of FIG. 2 may be regarded as a suitable compromise if, for example, $\nu_2 = 25$ and $\nu_1 = 67$.

Figure 5:
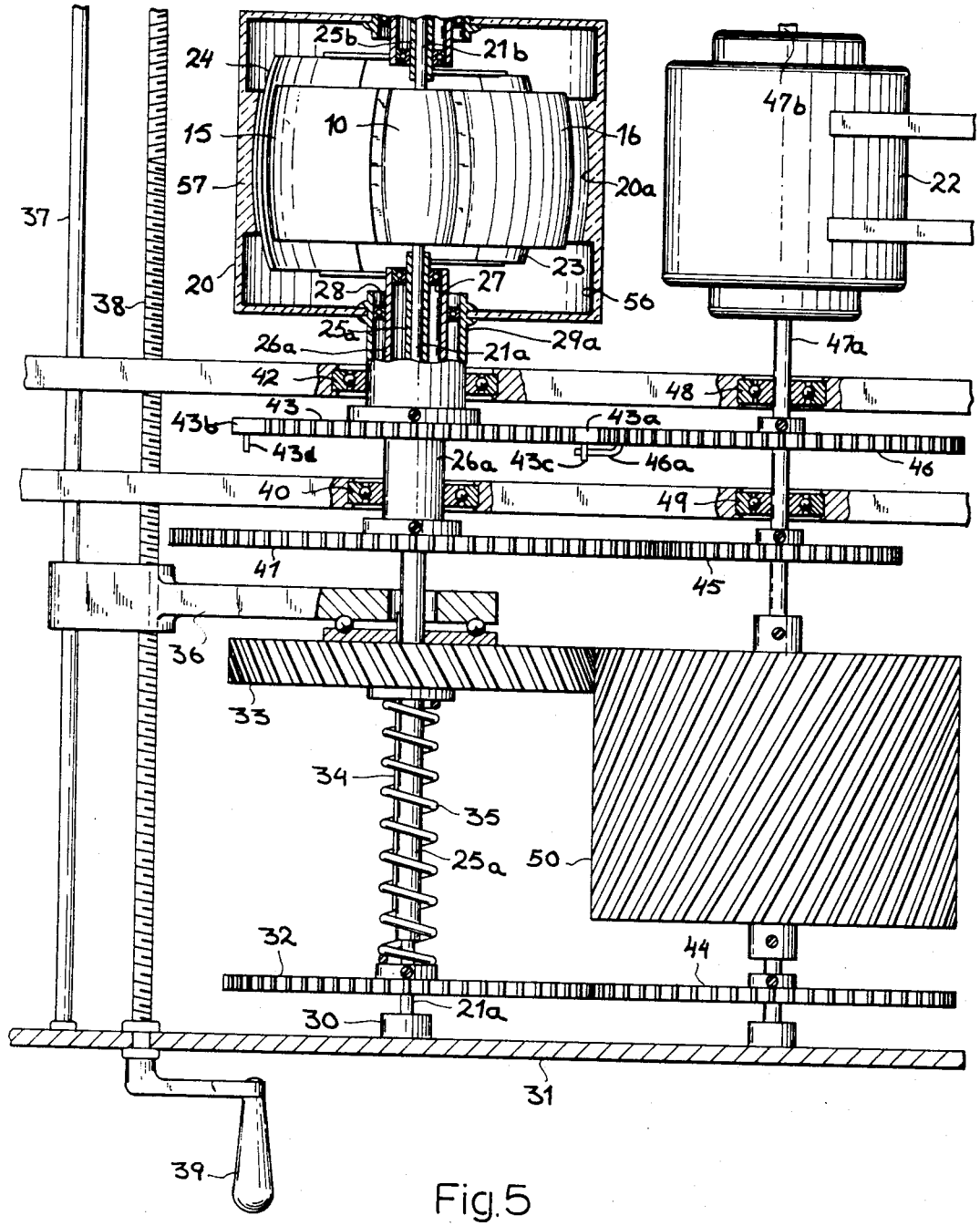
FIG. 5 is an elevational view, partly in section, of part of the system of FIG. 3 with its associated driving mechanism.

Reference will now be made to FIGS. 3–5 for a description of a system for taking wide-angle pictures by means of the lens 10 or similar lenses whose optically effective surfaces are concentric at least in the plane of rotation. The lens 10 is shown encased in a transparent cylinder 20 of glass or suitable plastic material, both the lens and the cylinder being rotatable about an axis 21 which passes through the point O (FIG. 1). The lens 10 is supported by a pair of shafts 21a, 21b driven by a motor 22. Also rotatable within cylinder 20 are the aforementioned light shield 23 and a shutter 24 individually supported on respective pairs of tubular shafts surrounding the shafts 21a and 21b. The inner diameter of cylinder 20 exceeds the outer diameter of the bodies 15 and 16 only sufficiently to form a clearance for the shutter 24. Moreover, the sides and adjacent peripheral portions of the lens may be provided with an opaque internal coating 56 as best seen in FIG. 5, leaving free only a central strip 57 of a width less than that of the lens 10. Furthermore, as seen in FIGS. 4a–4h, the annular window 57 may be blocked out at diametrically opposite locations by extensions 56a, 56b of the opaque coating in order further to restrict the incidence of extraneous light.

In FIG. 5, which illustrates only one half of the substantially symmetrical drive mechanism for the elements 10, 20, 23 and 24, the two shafts 25a, 25b supporting the light shield 23 have been shown, yet only one of the shutter-supporting shafts is visible at 26a. This shaft 26a is freely rotatable on shaft 25a by virtue of the interposition of ball bearings 27 (only one shown) and in turn, with the aid of similar ball bearings 28, supports a tubular shaft 29a which is one of a pair of shafts carrying the cylinder 20. Since shafts 25a and 25b are only limitedly adjustable relatively to shafts 21a and 21b and normally rotate at the same speed therewith, no bearings are shown provided between them.

As particularly illustrated for the shaft 21a, each of the lens-carrying innermost shafts 21a, 21b is journaled in a thrust bearing 30 on a wall 31 of the apparatus and carries a spur gear 32 rigidly secured to it. Each of the next pair of shafts, as shown for shaft 25a, carries a gear 33 with helicoidal teeth which is axially slidable on the shaft 25a but held against rotation relative thereto by a key 34. A compression spring 35 between gears 32 and 33 tends to displace the gear 33 axially inwardly, i.e., toward the lens 10, this axial motion being restrained by an arm 36 which is guided on a fixed rod 37 and matingly receives a lead screw 38 provided with a crank 39. Lead screw 38 is formed at its two ends with threads of opposite pitch so as to displace the arm 36 and its companion arm, not shown, toward or away from each other upon rotation of crank 39 in one sense or the other.

Shaft 26a is supported in a fixed bearing 40 and carries a spur gear 41 larger than gear 32. Shaft 29a, journaled in another ball bearing 42, carries a spur gear 43 whose diameter is equal to that of gears 32 and 33. Spur gears 32, 41 and 43 mesh with gears 44, 45 and 46 keyed to a drive shaft 47a of motor 22, a similar drive shaft 47b serving the symmetrical transmission on the opposite side of cylinder 20. Shaft 47a, journaled in fixed bearings 48 and 49, also carries a wide helicoidal gear 50 whose axial extent substantially corresponds to the range of displacement of gear 33 on shaft 25a.

The ratio of the gears 32, 41 and 43–46 is so chosen that lens 10 and the surrounding cylindrical drum 20 rotate at the same speed but that shutter 24 turns at half their rate. Normally, with gear 33 in a fixed axial position, this gear also rotates in step with gears 32 and 43 so that light shield 23 stays in a selected position relative to lens 10. This light shield is, however, angularly displaceable with reference to the lens so as to constitute, in effect, an adjustable diaphragm; if, for example, crank 39 is turned to move the arm 36 outwardly against the force of spring 35, gear 33 and, with it, shafts 25a, 25b and light shield 23 are given an extra twist which advances the shield 23 by a few degrees across the face of the disk to restrict its angle of view. It will be apparent that the adjustment of the light shield in this manner may be carried out when the system is either at standstill or in motion.

The rotation of cylinder 20 is made intermittent by virtue of the fact that the teeth of the gear 43 are interrupted at diametrically opposite locations 43a, 43b so that the associated drive gear 46 rotates idly when either of these locations is reached. Gear 43 also carries two pins 43c, 43d adjacent the gaps 43a, 43b, respectively; in the position illustrated in FIG. 5, a lug 46a on gear 46 is about to engage pin 43c so that gear 43 is rotated sufficiently to return into mesh with gear 46. After half a revolution of both gears, the gear 43 stops with its gap 43b next to gear 46 until the lug 46a thereof comes around again to engage the pin 43d and to step the drum 20 through another half of a revolution. It will be apparent that this arrangement affords positive synchronization between the two gears 43, 46 and also insures that the drum 20 will be arrested only in those positions in which its opaque layers 56a, 56b are out of the path of the light rays through lens 10.

As shown in FIG. 4a, drum 20 serves as a means for transporting a film 51 past the lens 10, it being understood that the outer radius of the drum equals the focal length $f$ of the lens (FIG. 1) so that the image is sharply focused on the film surface throughout an angle of nearly 180° subtended by the film along the drum surface. Stationary guard plates 54, 55 protect the incoming and outgoing portions of the film from incident light. A set of pressure rollers 52 are urged by springs 53 toward the periphery of drum 20 to maintain the film 51 in contact therewith.

Shutter 24 acts to prevent exposure of the film 51 when the lens 10 faces in the reverse position. Owing to the aforedescribed difference in the rotative speeds of the lens 10 and its shutter 24, their successive relative positions will be as shown in FIGS. 4a–4h representing a single revolution of the shutter. FIG. 4a shows the lens 10 centered on the film strip 51 so that the same is exposed to rays incident at angles up to $\pm\alpha_{max}$ from the horizontal. As the lens 10 rotates clockwise into the position of FIG. 4b, it projects rays from the upper quadrant of its field onto the lower half of the portion of film 21 hugging the drum 20. Further rotation, into the position of FIG. 4c, renders the lens ineffectual since by this time the shutter 24 has moved into a position obscuring the entrance end of the lens which is now constituted by the rear surface 112 (FIG. 1) of radius $R_3$. This action of the shutter continues through the position of FIG. 4d after which the lens is free to illuminate the lower portion of the film by light incident from the lower quadrant of its field of view. FIGS. 4e–4h show lens positions similar to those of FIGS. 4a–4d but with the shutter 24 out of phase by 180°; specifically, this shutter is interposed between the lens and the film in the positions of FIGS. 4f, 4g and 4h to prevent untimely exposure.

The timing of the drive of drum 20 is so arranged as to occur only when the lens is reversed and shuttered, i.e., as the lens moves from the position of FIG. 4b into that of FIG. 4d and from the position of FIG. 4f into that of FIG. 4h.

The system described in conjunction with FIGS. 3–5, with its automatic film transport synchronized with the rotation of the lens, is particularly suitable for cinematographic cameras; although the axis 120 has been indicated as horizontal in these figures, it will be understood that for panoramic exposures the camera may be turned so that the lens will sweep the field in a horizontal plane. It is, of course, also possible to separate the film transport from the lens drive; thus, the lens could be rotated during alternate exposures from the position of FIG. 4h clockwise into that of FIG. 4f and from the latter counterclockwise to the position of FIG. 4h, the film being advanced manually or otherwise after each exposure. If the lens never swings past the two quadrature positions shown in FIGS. 4f and 4h, the need for the shutter 24 will be obviated.

FIG. 5 also illustrates how the transparent cylindrical lens cage 20 may be used as a flattening lens effective in a dimension transverse to the plane of rotation. To this end, the central wall portion 20a of the glass cylinder 20, which is free from coating 56 (except at locations 56a, 56b) to form the window 57, is given a substantially plano-concave profile which may be similar to that of the annular lens 44 shown in Bouwers Patent No. 3,044,379. The flattening is necessary since it is assumed that the surfaces 110, 111, 112 of lens 10 are all spherical segments.

In FIGS. 6 and 7 I have shown an alternate film support 120 (the lens being shown in dot-dash lines and the other rotary parts having been omitted for the sake of clarity) which consists of two axially separated flanged disks 120a, 120b respectively carried by shafts 129a, 129b. These shafts are rotated in synchronism by suitable gears on opposite shafts 47a, 47b of motor 22 (FIG. 5) as has been described in conjunction with the system of FIG. 3. The film 151 bridges the disks 120a, 120b onto which it is pressed by spring-loaded rollers 152a, 152b. A stationary light barrier 156, provided with a window 157, is fixedly disposed within the space encompassed by the support 120 and is formed, opposite that window, with a transparent portion 158 of nonuniform thickness constituting a stationary flattening lens. As will be seen from FIG. 6, window 157 and lens 158 each extend over nearly a semicircle in proximity of the film 151.

The lenses heretofore described are reversible, i.e., their optical behavior is similar when the direction of the light rays passing through them is inverted. Thus, I have shown in FIGS. 8 and 9 a lens 10′ which is substantially an inversion of the lens 10 of FIG. 1, its front and rear portions 11′, 12′ being separated by a forwardly convex internal surface 111′ while the refractive index $n_1'$ of front member 11′ is greater than the index $n_2'$ of rear member 12′. An incident ray 101, parallel to axis 100, includes with the radius $R_1'$ of front surface 110′ an angle $\alpha'$ which changes to $\beta'$ within the member 11′: at the internal surface 111′ the ray includes with the radius $R_2'$ of that surface an angle $\gamma'$ within member 11′ and an angle $\delta'$ within member 12′. The angle of incidence at the rear surface 112′, with reference to its radius $R_3'$, is $\epsilon'$ ahead of that surface and $\varphi'$ beyond it; by analogy with FIG. 1, the angles included by the radii $R_2'$, $R_3'$ with the axis 100 have been designated $\xi'$ and $\eta'$, respectively.

With this inverted system, in which $$\left|\frac{R_1'}{R_2'}\right| \equiv K_1'$$

and $$\left|\frac{R_1'}{R_3'}\right| \equiv K_2'$$

the magnitude of $E'$ in the expression $$f_b = R_3' \frac{E'}{K_2' - E'} \qquad (3')$$

is given by $$E' = \frac{K_1' + K_2'}{n_2'} - \frac{K_1' - 1}{n_1'} - 1 \qquad (2')$$

Figure 10:
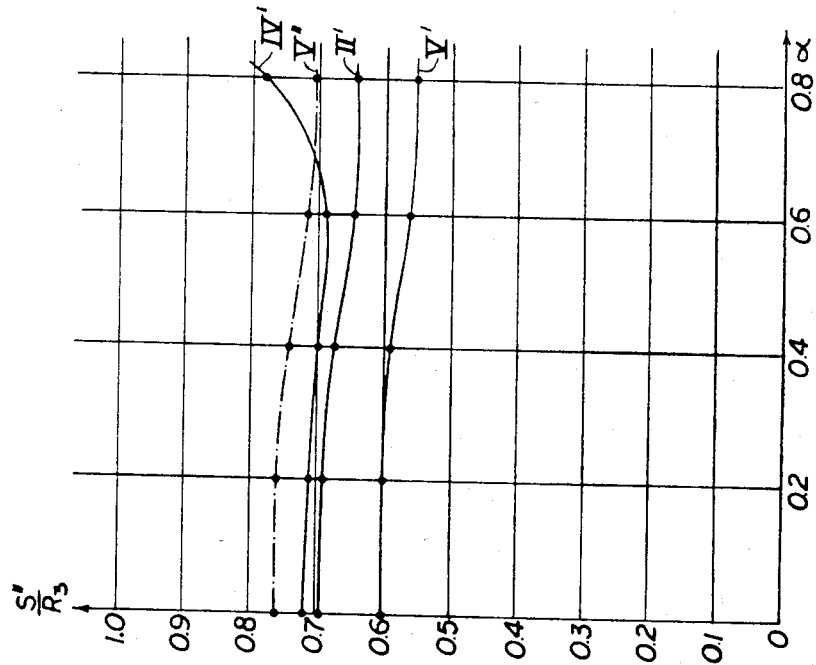
FIG. 10 is a set of graphs similar to FIG. 2, pertaining to the lens shown in FIGS. 8 and 9.

The following table lists, by way of example, the parameters of three lenses constituting inversions of the systems represented by the Curves II, IV and V of FIG. 2 (see also Table A); the deviation curves of these three inverted lenses have been shown at II′, IV′ and V′ in FIG. 10.

TABLE C

| Curve | $n_1'$ | $n_2'$ | $K_1'$ | $K_2'$ | $f_b/R_3'$ | $f_b + R_3' - R_1'/R_1'$ |
|---|---|---|---|---|---|---|
| II′ | 1.75 | 1.5 | 1.8 | 1 | 0.696 | 0.696 |
| IV′ | 1.75 | 1.5 | 1.9 | 1 | 0.725 | 0.725 |
| V′ | 1.75 | 1.5 | 1.73 | 0.91 | 0.6 | 0.76 |

The final column of Table C lists the value $$\frac{f_b + R_3' - R_1'}{R_1'} = \frac{f_b}{R_1'} + \frac{1}{K_2'} - 1$$

which must be identical with the value $f_b/R_3$ given for the corresponding system in Table A and which is, of course, equal to $f_b/R_3'$ whenever, as with the first two systems, $K_2' = 1$. The curve V″ has been included in FIG. 10 to show, for purposes of better comparison with the curve of FIG. 2, the parameters $s''/R_3' + 1/K_2' - 1$ plotted against $\alpha'$. It will be seen that the Graphs II′, IV′ and V′ of FIG. 10 are generally similar to the Graphs II, IV and V, respectively, of FIG. 2.

Figure 8:
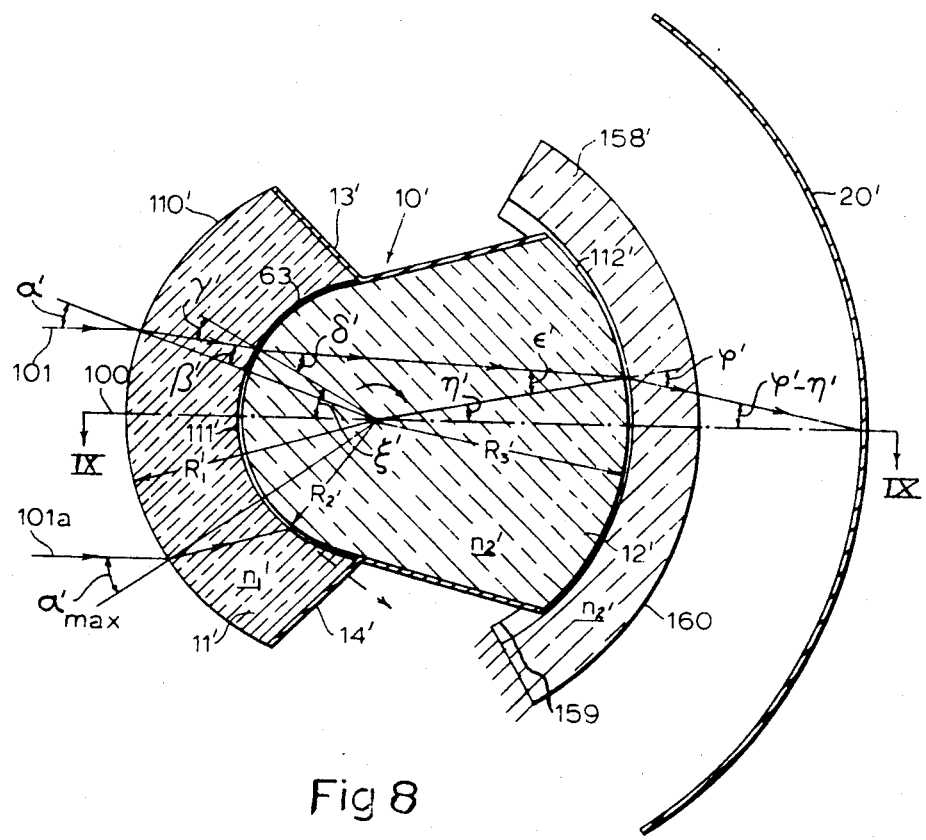
FIG. 8 is a view similar to FIG. 1, illustrating an inversion.

The lens 10′, as also the lens 10 of FIG. 1 (cf. FIG. 15), is armored along its sides with opaque and nonreflecting shielding 61, 62 (FIG. 9) in addition to the light shields 13′, 14′ visible in FIG. 8.

Furthermore, in contradistinction to lens 10, the lens 10′ is formed with a narrow air gap 63 along its internal surface 111′, this air gap separating the two portions 11′, 12′ from each other. The effect of the air gap 63 is to cut off the light rays incident at an angle greater than the limiting angle $\alpha'_{max}$, as illustrated for the ray 101a, as these rays undergo internal reflection on reaching the surface 111′. The value of $\alpha_{max}$ is given by the relationship $$n_1' \gamma'_{max} = K_1' \alpha'_{max} = 1 \qquad (12a)$$

whence $$\alpha'_{max} = \frac{1}{K_1'} \qquad (12b)$$

Thus, the gap 63 acts as a virtual diaphragm limiting the field of incident rays for each beam direction. If this gap is sufficiently narrow, the rays that are not internally reflected will have substantially the path they would have if the lens members 11′, 12′ were cemented together.

It will be apparent that the gap 63 need not be provided at the junction of the two differently refracting lens members, though this is most convenient, but could also be located within either of these members forwardly or rearwardly of surface 111′. In the first case, i.e., if member 11′ is split concentrically, the value of $\alpha'_{max}$ will be greater than that given by Equation 12b; in the second case, i.e., if the gap is within member 12′, it will be less. Naturally, such a gap could also be provided within the member 11 of lens 10 (FIG. 1), in order to reduce the maximum field angle to less than the value $\alpha_{max}$ given in Table A.

The use of a beam-limiting concentric gap in a spherical or cylindrical system is, of course, not limited to rotating sectoral lenses; in a stationary lens the gap could extend, for example, over an arc of 180° or even 360°.

Figure 9:
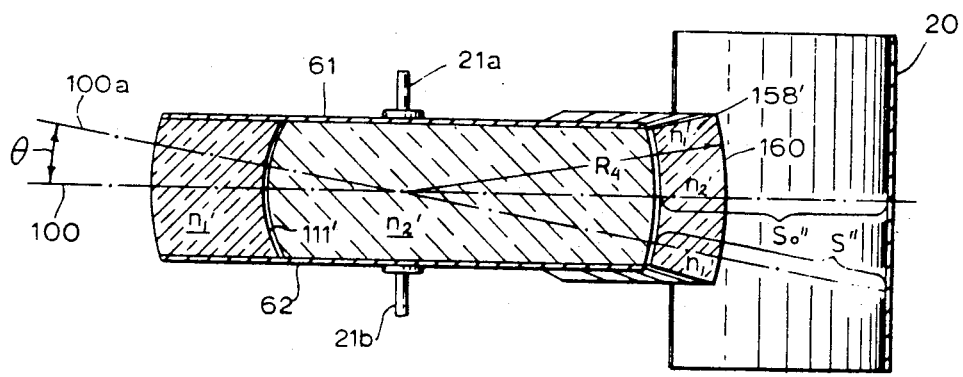
FIG. 9 is a cross-sectional view taken on the line IX—IX of FIG. 8.

Finally, I have shown in FIGS. 8 and 9 a stationary dispersive flattening lens 158′, to the rear of lens 10′, whose front and back surfaces 159, 160 are concentric with those of the rotating lens 10′ and whose optical effect derives from its varying refractive index $n_v$. The radius of surface 159 is here shown but slightly greater than $R_3'$ (this being, of course, possible only if $R_3'$ is at least equal to $R_1'$ in order that lens 158′ should not interfere with the rotation of lens 10′), the radius of surface 160 having been designated $R_4$. Within the central plane of rotation visible in FIG. 8, which includes the axis 100, the value of $n_v$ is relatively small and may substantially equal $n_2'$; in a direction transverse to that plane, as seen in FIG. 9, this index increases progressively to a relatively large value which may be substantially equal to $n_1'$. In order to afford the desired flattening of the image as projected upon the film 20′, the back-focal distance $s''$ of the overall system should vary according to the relationship $$s'' = \frac{R_4(1-\cos\theta)+s_0''}{\cos\theta} \qquad (17)$$

$\theta$ being the angle of incidence of a ray 100a with reference to axis 100 in the plane of FIG. 9; the relationship between $s''$ and $n_v$ may be expressed as $$s'' = \frac{f_b R_3' R_4 n_v}{R_3' R_4 n_v - f_b(R_4-R_3')(n_v-1)} \qquad (18)$$

whence, upon substitution of $n_2'$ for $n_v$, $$s_0'' = \frac{f_b R_3' R_4 n_2'}{R_3' R_4 n_2' - f_b(R_4-R_3')(n_2'-1)} \qquad (18a)$$

From these equations the law of $n_v$ as a function of $\theta$ may be derived, yet this need not be strictly adhered to because, in practice, the small spread of refractive indices limits the field angle to relatively small values $\pm\theta_{max}$ if the lens 158′ is to be of moderate width. Thus, if $$\frac{R_4}{R_3'} = 1.2, \ \theta_{max} \approx 5°$$

if $$\frac{R_4}{R_3'} = 2, \ \theta_{max} \approx 8°$$

The lens 158′ may, of course, be used in place of the substantially sphero-cylindrical lens 158 illustrated in FIG. 7.

FIG. 11 illustrates the combination of lens 10 with a special flattening lens 210 fixedly positioned in front thereof. Lens 210 has a planar forward face 211 and a concave rear face 212 of noncircular cross-section, described more fully hereinafter with reference to FIG. 14, which is so shaped that the rays emerging from the rear surface 112 of lens 10 are focused on a flat surface 220 transverse to axis 100. To this end it is necessary that the incident rays 201, taken to originate at an infinitely distant object and therefore to be parallel, are so refracted by the surface 212 as to diverge to a different extent for different angles of incidence so that the secondary focus F″ will always fall on the plane 220. It is assumed here that both lenses 210 and 10 have identical curvatures in all planes which include their common axis 100, yet the extent of lens 210 in the plane of rotation of lens 10 about axis 21 may be considerably greater than in a plane transverse thereto. With this arrangement it is, of course, no longer necessary to provide a flattening lens behind the lens 10, e.g., as shown at 20a in FIG. 5.

At 230 I have shown, in dot-dash lines, an auxiliary lens of conventional spherical curvature (not necessarily concentric with lens 10) which may be used in addition to lens 210, or as integral part thereof, to focus the system upon objects at finite distances, or to allow it to project images upon a screen or the like from, say, a film passing along plane 220. Lens 230 may, of course, be designed in keeping with the usual technique as a singlet, a doublet or any suitable combination of members with the desired focal length; its refractive index and/or Abbé number $\nu$ may or may not be equal to those of lens 210. The sole requirement, insofar as the present invention is concerned, is its ability to let the light rays of a given beam pass parallel between the surfaces 211 and 212 of lens 210.

Figure 12:
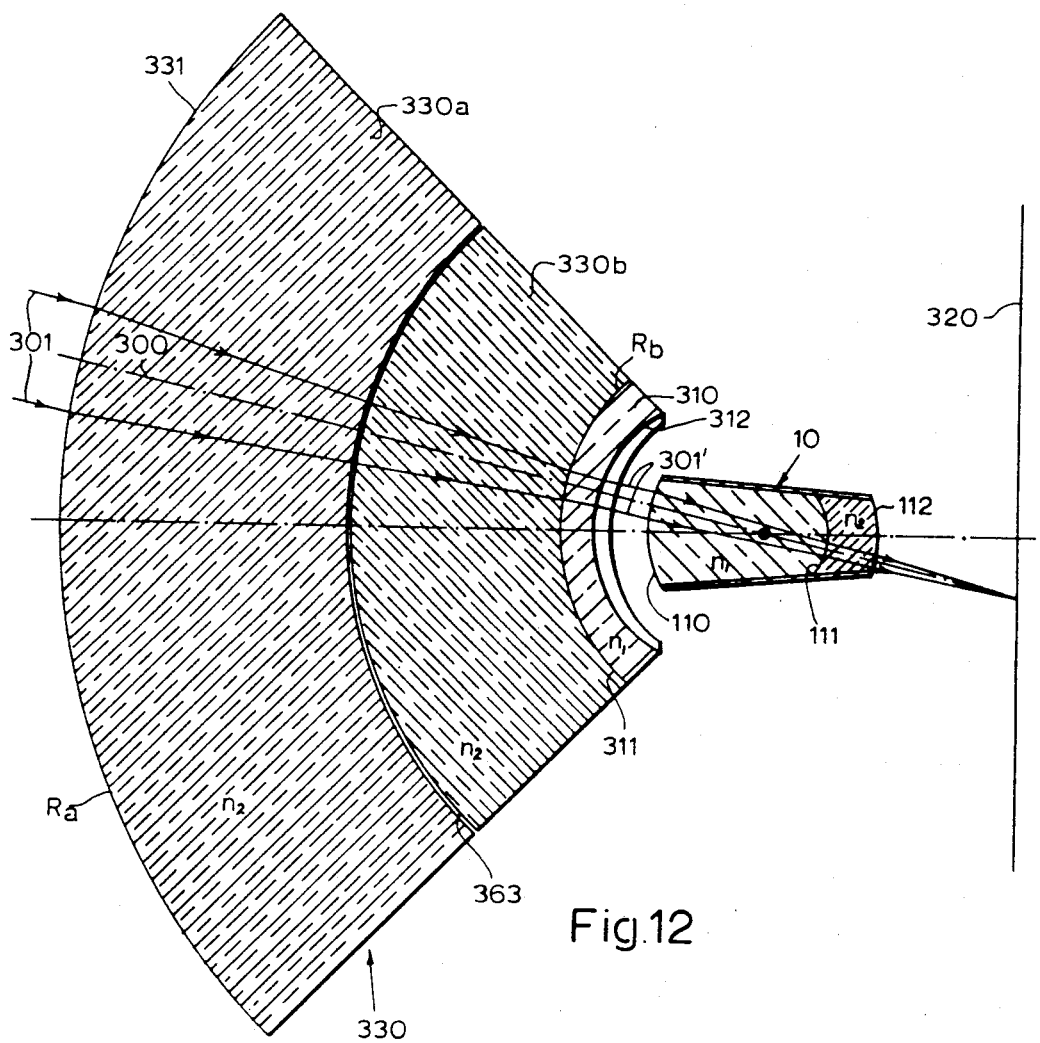
FIG. 12 is a view similar to FIG. 11, showing a modified form of flattening front lens.

In FIG. 12 I have shown a modified system similar to that of FIG. 11 wherein, however, a field of parallel rays between surfaces 311, 312 of a lens member 310 is produced (for a primary focus at infinity) with the aid of an auxiliary lens member 330 bounded by spherical surfaces 311, 331 concentric with the surfaces 110, 111 of lens 10. This is accomplished by choosing the radii $R_a$ and $R_b$ of surfaces 331 and 311, respectively, so that the power of member 330 is zero, it being assumed that the refractive index of member 310 is less than that of member 330. If, for convenience, we again assign the values $n_1=1.5$ and $n_2=1.75$ to these two members, we find that the power of member 330 is given as $$\frac{0.75}{R_a} - \frac{0.25}{R_b} + \frac{0.75(R_a-R_b)}{7R_a R_b}$$

whence, for zero power, $$R_a = \frac{9}{2}R_b$$

Naturally, for focusing upon finite distances a smaller ratio of $R_a/R_b$ may be used. The front lens 331 of FIG. 12, while bulky, may be useful in situations where large pressure differences are to be sustained, e.g., in an aircraft or missile. As the rear surface of lens 310 is identical with that of lens 210, the image is again projected upon a planar surface 320 (or, conversely, a film on that plane may be reproduced by projection onto a screen through the lens system 10, 310, 330). Lens 330 is shown composed of two portions 330a, 330b separated by a narrow, forwardly convex spherical gap 363 which acts as a virtual diaphragm, limiting the field of incident rays, in the manner described in conjunction with FIGS. 8 and 9.

The curvature of the concave rear surfaces 212 and 312 of lens members 210 and 310 in FIGS. 11 and 12 will now be described with reference to FIGS. 13a–13d and 14.

According to the classical theory of optics, a planar beam of parallel light rays traversing a circular boundary between two media of different optical densities is caused to converge upon a real focus beyond the boundary if the latter is concave toward the denser medium but is caused to diverge, seemingly originating at a virtual focus before the boundary, if the latter is of the opposite curvature. If the refractive indices of the two media are 1 and $n$, respectively, the distance between the focus and the boundary is given as $$\frac{r}{n-1}$$

if the beam comes from the side of the more permeable medium (e.g., air) and as $$\frac{nr}{n-1}$$

if it originates within the denser medium. The first situation is illustrated in FIGS. 13a and 13d, the second in FIGS. 13b and 13c.

FIG. 13a shows a beam $B_a$, composed of rays parallel to an axis $A_a$, impinging upon a positively refracting boundary between an optically thinner and an optically denser medium, the latter having the refractive index $n$. The boundary may be considered in the first approximation, for rays close to the axis, as circle $C_a$ illustrated in dot-dash lines. More exactly, however, this boundary is constituted by an ellipse $E_a$, the focal length $f_a$ constituting the distance between the vertex $V_a$ and the distal focus $F_a$ of the ellipse. The eccentricity $e$ of the ellipse, whose half-axes bear the usual designations $a$ and $b$, is given by the relationship $$e = \sqrt{a^2 - b^2} = \frac{a}{n} \qquad (19)$$

Curve $C_a$ is, of course, the osculatory circle of the ellipse at its vertex $V_a$, the radius $a$ of this circle being equal to $a^2/b$. With $n=1.5$, the focal length $f_a = a + e = 3r$.

FIG. 13b shows a similar positively refracting surface represented in first approximation, for paraxial rays, by a circle $C_b$. The beam $B_b$ parallel to axis $A_b$ originates within the denser medium to the left of the boundary and is focused on a point $F_b$ whose distance from vertex $V_b$ is given (for the previously assumed value of $n$) as $f_b = 2r$, $r$ being again the radius of the circle. It can be shown that $F_b$ is the distal focus of a hyperbola $H_b$ which osculates the circle $C_b$ and whose half-axes $a$, $b$ and eccentricity $e$ satisfy the relationship $$e^2 = \sqrt{a^2 + b^2} = na \qquad (20)$$

FIG. 13c shows the case of a negatively refracting boundary traversed by a beam parallel to axis $A_c$, the boundary being defined by a circle $C_c$ osculating a hyperbola $H_c$. The virtual focus $F_c$ is again the distal focal point of hyperbola $H_c$, its distance $f_c$ from the vertex $V_c$ being given by Equation 20. In this figure, as in FIG. 13b, the beam impinges upon the boundary from the side of the denser medium.

A reversal of the situation shown in FIG. 13c has been illustrated in FIG. 13d wherein a beam $B_d$, centered on an axis $A_d$, enters the denser medium by way of a negatively refracting boundary defined by a circle $C_d$ osculating an ellipse $E_d$. The parameters of the ellipse $E_d$ are the same as those of ellipse $E_a$ in FIG. 13a, point $F_d$ being one of the foci of the ellipse whose distance $f_d$ from the distal vertex $V_d$ is defined by Equation 19.

It should be noted that the ellipses and hyperbolas described in connection with FIGS. 13a–13d apply only to parallel rays; the more general case, in which rays originating at one point are focused upon another, cannot be solved with any second-order curve. Moreover, these conic sections are of but limited utility in practical optical applications since their focusing action extends only to beams incident in a certain direction, i.e., parallel to the axis.

In my copending application Ser. No. 850,628, filed Nov. 3, 1959, now patent No. 3,112,355, issued Nov. 26, 1963, I have shown in connection with a catoptric system that it is possible to construct a curve which osculates in each point a different conic (specifically a hyperbola), the locus of the foci of all these conics being a predetermined curve which is the conjugate of a straight line. In accordance with a feature of my present invention, as will be more fully described with reference to FIG. 14, I propose to utilize the same technique in plotting the curvature of lens surface 212 or 312 (FIGS. 11 and 12) to insure that the rays projected through lens 10 coverage upon the plane 220 or 320 at all angles of incidence.

Figure 14:
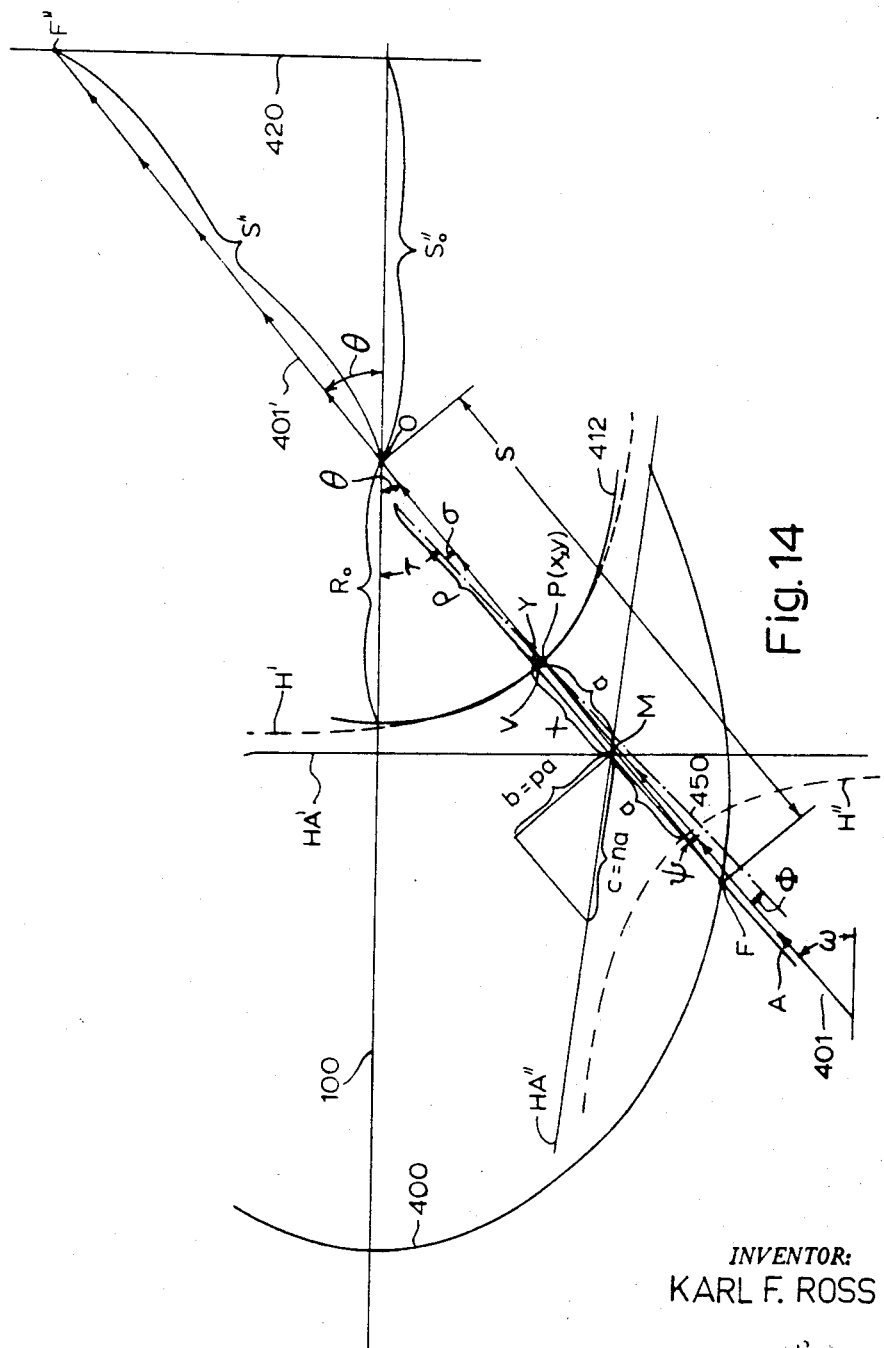

In FIG. 14 the spherical lens 10, whose center is shown at O, has not been illustrated since its only parameter of interest for the subsequent analysis is its focal length $f$. In fact, for purposes of this discussion the lens 10 could even be a homogeneou spherical segment having a characteristic as shown in Graph I of FIG. 2, provided of course that its field of view were limited to a solid angle small enough to reduce the defocusing effect for slanting rays to a tolerable value.

The curve 412 in FIG. 14 represents the profile of the surface 212 and 312 of FIGS. 11 and 12, it being understood that this curve should also be the outline of a cylindrical surface if focusing in only one plane were desired. The line 420, perpendicular to axis 100, is representative of the projection surfaces 220 and 320 of the two preceding figures.

If a lens centered on point 0, having a focal length $f$, is to concentrate incident parallel rays upon the line 420 at all angles of incidence, these rays must reach the lens as divergent beams originating from point F on a curve 400 having a distance $s$ from O, the distance $s''$ of O from the conjugate point $f''$ on line 420 being given by the known relationship $$\frac{1}{s} + \frac{1}{s''} = \frac{1}{f} \qquad (21)$$

If the angle of incidence is designated $\theta$, and if the distance between point 0 and line 420 is named $s_{0''} = kf$, then $$s'' = \frac{kf}{\cos\theta} \text{ and } s = \frac{kf}{k - \cos\theta} \qquad (22)$$

Thus, in order that $s$ be finite for all values of $\theta$ including 0, $k$ must be greater than 1.

Figure 13:
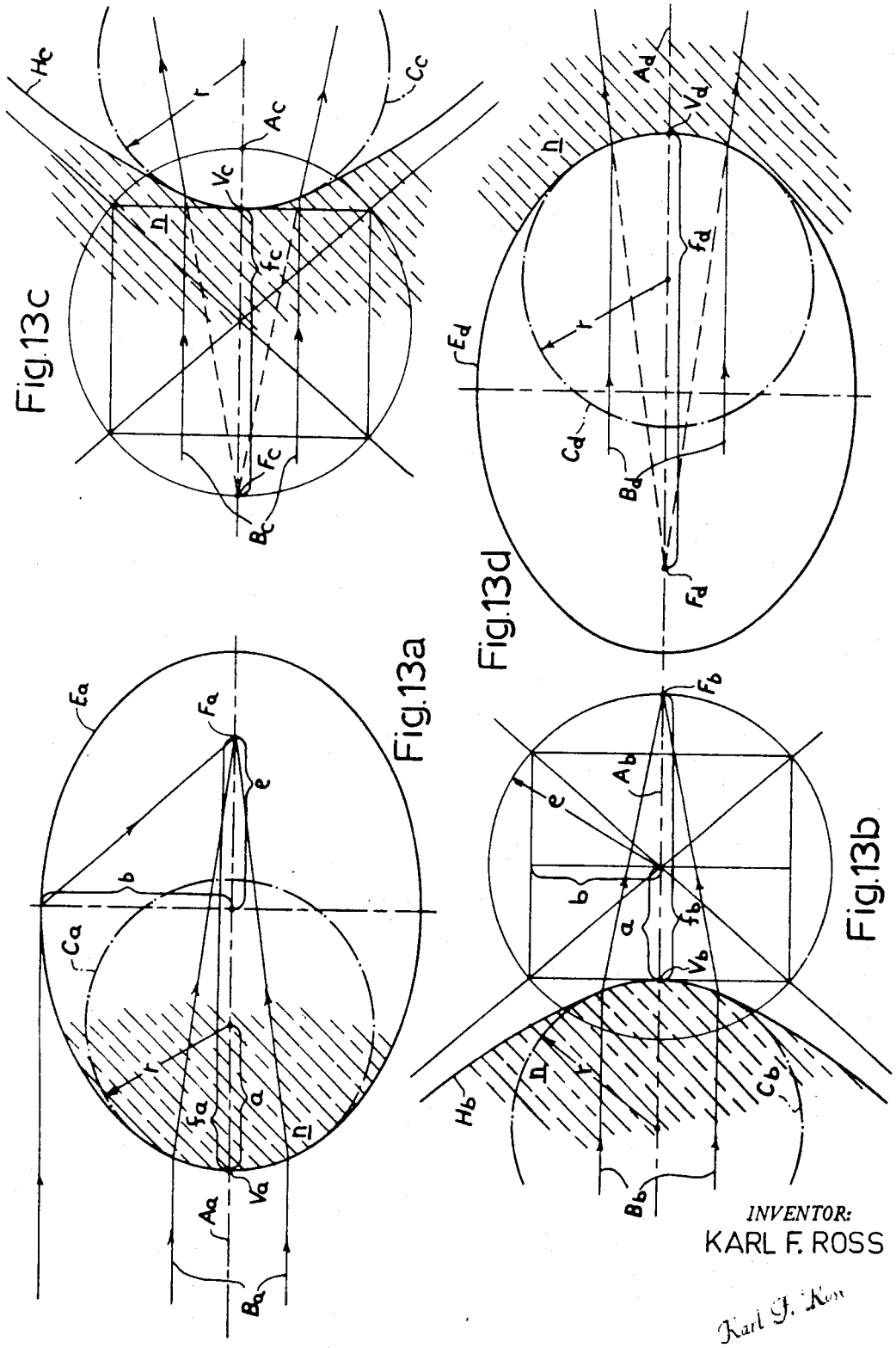
FIGS. 13a–13d and 14 are graphs used in explaining the construction of the flattening lenses of FIGS. 11 and 12.

The curve 412, representing the dispersive boundary between two media of refractive indices $n$ and 1, respectively, is so designed as to osculate in each point $P(x, y)$ a respective hyperbola H′, H″ whose axis A is parallel to the direction of a ray 401 incident at P which is refracted by the boundary 412 toward the point O; axis A intersects the curve 400 in a point F whose distance from the vertex V proximal to point P satisfies the relationship established with reference to focus $F_0$ and vertex $V_c$ of hyperbola $H_c$ in FIG. 13 as given by Equation 20; thus, the distance $\overline{FV}$ equals $a + e = a(n+1)$, $a$ and $b \equiv pa$ being the half-axes of the hyperbola whose asymptotes are shown at HA′, HA″ and which is centered on a point M. In a co-ordinate system based upon the axes $a$ and $b$ of the hyperbola, with M as the origin, point P has the abscissa X and the ordinate Y bearing the well-known relationship $$1 = \frac{X^2}{a^2} - \frac{Y^2}{b^2} = \frac{X^2}{a^2} - \frac{Y^2}{p^2 a^2} \qquad (23)$$

From Equations 20 and 23 we obtain $$p^2 = n^2 - 1 \qquad (24)$$

whence $$\frac{X^2}{a^2} - \frac{Y^2}{(n^2-1)a^2} = 1 \quad (25)$$

and $$Y = \sqrt{(n^2-1)(X^2-a^2)} \quad (26)$$

At 450 I have indicated the perpendicular to curve 412 in point P. This perpendicular includes an angle $\Phi$ with the direction of the axis A and that of the incident ray 401 parallel thereto. The refracted ray 401' lies on a straight line between points P and O, the angle included between this line and the axis A being designated $\psi$. The radius of curvature $\rho$, which of course coincides with the perpendicular 450, includes with the principal axis 100 an angle $\tau$ and with ray 401' an angle $\sigma$. The angle of incidence between ray 401 and axis 100 has been designated $\omega$.

The following relationship obtain between the various angles identified above:

$$\frac{dY}{dX} \equiv Y' = \cot \psi \quad (27)$$

$$\sin \sigma = n \sin \psi \quad (28)$$

$$\omega = \tau - \phi \quad (29)$$

$$\psi = \sigma - \phi \quad (30)$$

Point P can also be defined in polar co-ordinates by its distance R from point O and the angle $\theta$, with $R \cos \theta = x$ and $R \sin \theta = Y$. The distance $\lambda$ between F and P will be found to equal $nX + a$, with $$\sin \psi = \frac{(n^2-1)(X^2-a^2)}{nX+a} \quad (31)$$

and $$\cos \psi = \frac{an+X}{nX+a} \quad (32)$$

Furthermore, as will be clearly apparent from the drawing, $$\lambda = nX + a = s - R \quad (33)$$

From the foregoing relationships, in conjunction with the well-known formula for the radius of curvature $$\rho = \frac{(R^2+R'^2)^{3/2}}{R^2+2R'^2-RR''} \quad (34)$$

(where $R' \equiv dR/d\theta$ and $R'' \equiv d^2R/d\theta^2$, it can be shown that $$a = \frac{R^3}{(n^2-1)(R^2+2R'^2-RR'')} \quad (35)$$

and also $$a = \frac{R(s-R)[\sqrt{n^2(R^2+R'^2)}-R]}{(n^2-1)(R^2+R'^2)} \quad (36)$$

from which $$s = \frac{R^2(R^2+R'^2)}{(R^2+2R'^2-RR'')[\sqrt{n^2R^2+R'^2(n^2-1)}-R]} + R \quad (37)$$

Let $t \equiv \tan \theta/2$, $\sin \theta = 2t/1+t^2$, $\cos \theta = 1-t^2/1+t^2$ and $d\theta = 2dt/1+t^2$, then, with $\dot{R} \equiv dR/dt$ and $\ddot{R} \equiv d^2R/dt^2$, Equation 37 can be rewritten, using the value of $s$ taken from Equation 2, in the following form:

$$\frac{kf(1+t^2)}{k-1+t^2(k+1)} = R +$$

$$\frac{2R^2[4R^2+\dot{R}(1+t^2)^2]}{\{4R^2+2R^2(1+t^2)^2-R(1+t^2)[(1+t^2)\ddot{R}+2t\dot{R}]\}} \cdot [\sqrt{4n^2R^2+\dot{R}^2(1+t^2)(n^2-1)}-2R]$$

$$(38)$$

Since curve 412 is to be symmetrical about axis 100, $\dot{R}_0 = 0$ for $\theta = 0$, $t = 0$. If, for convenience, $k = n$ so that $s_0$ has the finite value $nf/n-1'$, the value of $\ddot{R}_0$ is found to be $$\ddot{R}_0 = 4nR_0 \frac{f-R_0}{nf-R_0(n-1)} \quad (39)$$

It thus follows that, if $R_0$ is selected to equal $f$, $\ddot{R}_0$ also goes to zero.

The dependent variable R of the polar co-ordinate system R, $\theta$ may now be expressed as a polynomial $$R = R_0 + \frac{d^2R_0}{2dt^2}t^2 + \frac{d^4R_0}{24dt^4}t^4 + \frac{d^6R_0}{720dt^6}t^6 + \cdots \quad (40)$$

according to Maclaurin's formula, the coefficients of the odd-numbered powers of $t$ being zero. The higher derivatives of R at the point $t = 0$ are found by repeated differentiation to have the following values:

$$\frac{d^2R_0}{dt^2} \equiv \ddot{R}_0 = 0$$

$$\frac{d^4R_0}{dt^4} = \frac{-16nR_0}{n-1}$$

$$\frac{d^6R_0}{dt^6} = R_0 \frac{46n(n+4)}{n-1}$$

substituting these values in Equation 40, we obtain $$R = R_0\left[1 - \frac{2nt^4}{3(n-1)} + \frac{4n(n+4)t^6}{45(n-1)} - \cdots\right] \quad (41)$$

For the specific value of $n = 1.5$, we thus obtain the formula $$R = R_0\left(1 - 2t^4 + \frac{22}{15}t^6 - \cdots\right) \quad (42)$$

which is reasonably accurate for angles up to about $\theta = 60°$.

It will thus be aparent that the system illustrated in FIGS. 11, 12 and 14 has an axis of symmetry 100 which passes through the middle of the dispersive stationary lens 210 or 310 and through the center of the rotatable collective lens 10, the rear face 212 or 312 of the dispersive lens being provided with a noncircular curvature (at least in a plane transverse to axis 21) which converts incident beams 201, 301 of parallel light rays into diverging beams 201', 301' with axes 200, 300 trained upon the lens axis 21, these axes coinciding in FIG. 14 with the ray 401' which constitutes a principal ray in a bundle of parallel light rays incident upon the boundary 412 in the vicinity of the point P; the intersection between the beam axis or principal ray and the locus 400, represented by point F in FIG. 14, is one of the foci of a hyperbola (H', H'') which osculates the boundary 412 at the point P but which has different parameters for different such points, except that the relationship expressed by Equation 20 holds true for all these hyperbolas.

Figure 15:
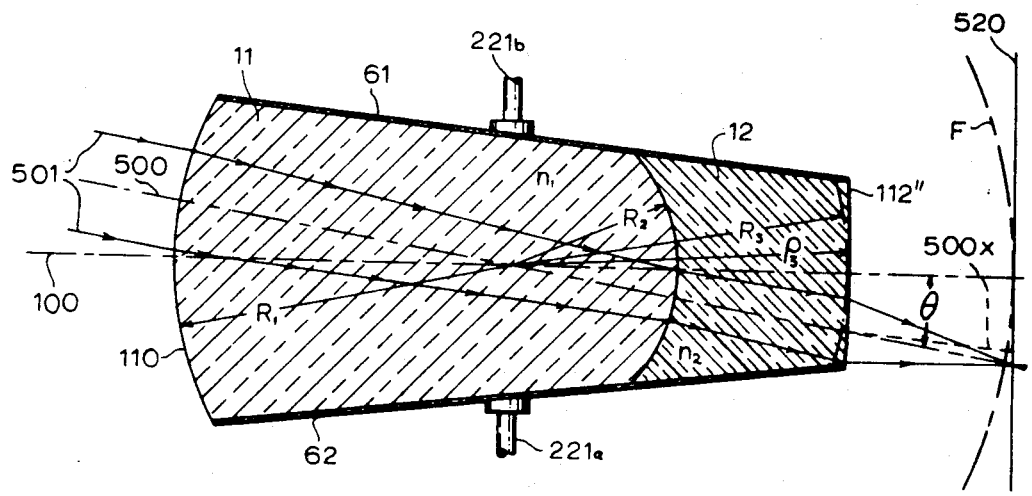
FIG. 15 is a cross-sectional view of the lens of FIG. 1 in modified form, taken on the line XV—XV of that figure.

In FIG. 15 I have shown, in transverse section, a modification of lens 10 in which the rear surface of lens member 12 is not a spherical segment, as heretofore assumed, but has a noncircular curvature 112'' in a plane including the axis of shafts 221a, 221b; in a plane transverse thereto, i.e., the one visible in FIGS. 1, 11 and 12, this face still is bounded by a circular arc centered on the point O. The radius $\rho_3$ of curvature 112'' is so chosen that slanting beams 501 are caused to converge not along the arc F but on a straight line 520 tangent thereto, this line corresponding for example to a generatrix of the transparent cylinder 20 in FIG. 5. For this purpose the radius $\rho_3$ exceeds the radius $R_3$ of the circular arc 112 (FIG. 1) by progressive increments with increasing distance from the axis 100, $\rho_3$ being equal to $R_3$ along that axis only.

Equation 3 may be rewritten to give the focal length $f$ of lens 10, in terms of the radius $R_1$ of front surface 110, as $$f = \frac{R_1}{K_2 - E} \quad (43)$$

which suggests that, for a focal length varying inversely with cos $\theta$ where $\theta$ (by analogy with FIG. 14) is the angle between the beam axis 500 and the lens axis 100, $$\cos\theta = \frac{f_0}{f} = \frac{K_2(\rho) - E(\rho)}{K_2 - E} \quad (44)$$

wherein $K_2(\rho)$ and $E(\rho)$ have the same significance as $K_2$ and $E$ but with substitution of $\rho_3$ for $R_3$. For the specific values for $n_1$ and $n_2$ heretofore assumed, Equation 44 yields the relationship $$K_2(\rho) \equiv \frac{R_1}{\rho_3} = K_2 \cos\theta + \frac{(2K_1 - 7)(1 - \cos\theta)}{9} \quad (45)$$

whence $$\rho_3 = \frac{9R_1}{(9K_2 - 2K_1 + 1)\cos\theta + 2K_1 - 1} \quad (46)$$

The foregoing formula for $\rho_3$ is, however, not precise because, on the one hand, the noncircular curvature 112'' causes a deflection of the beam axis as exaggeratedly indicated at 500x, thereby reducing the effective length of $f$, and because, on the other hand, the cross-section of the rear surface of lens member 12 in a plane including the axis 500 is, strictly speaking, not a circular arc but the arc of an ellipse with the major half-axis $\rho_3$ and the minor half-axis $R_3$, hence the curvature of the rear lens face within that cross-section has a radius smaller than $\rho$. Since these two abberrations tend to balance each other for small angles $\theta$, the expression for $\rho_3$ given in Equation 46 or, more generally, derived from Equation 44 may be considered suitable for most cases.

It will be apparent that a flattening lens of the general type shown at 158' in FIGS. 8 and 9 could also be given an aspherical rear surface similar to the surface 112'' of FIG. 15, in lieu of or in addition to its varying index of refraction, with consequent enlargement of its field angle $\theta$; conversely, the lens 158', with or without this modification, could be made integral with lens 10' for rotation therewith.

My invention is, of course, not limited to the specific embodiments as described and illustrated but may be modified in various respects, including the combination of compatible features from different embodiments, without departing from the spirit and scope of the amended claims.

I claim:

1. A dioptric component comprising a lens composed of at least two members of different refractivity forming two outer refractive surfaces and at least one internal refractive surface, said surfaces being defined in at least one plane by concentric circular arcs, one of said members being biconvex, of relatively low refractive index and bounded by said internal surface and one of said outer surfaces, the other of said members being concavo-convex, of relatively high refractive index and bounded by said internal surface and the other of said outer surface, said one of said outer surfaces having a radius in said plane whose absolute length approximately equals that of the radius in said plane of said other of said outer surfaces and is substantially twice the absolute length of the radius in said plane of said internal surface.

2. A dioptric component comprising a lens composed of at least two members of different refractivity forming two spherically curved outer refractive surfaces and at least one spherically curved internal refractive surface, said surfaces being all concentric with one another, one of said members being biconvex, of relatively low refractive index and bounded by said internal surface and one of said outer surfaces, the other of said members being concavo-convex, of relatively high refractive index and bounded by said internal surfaces and the other of said outer surfaces, said one of said outer surfaces having a radius whose absolute length approximately equals that of the radius of said other of said outer surfaces and is substantially twice the absolute length of the radius of said internal surface.

3. A component as defined in claim 2 wherein said members are separated from each other by a narrow air gap along said internal surface.

4. A dioptric component comprising a lens composed of at least two members of different refractivity forming two positively refracting spherically curved outer refractive surfaces and at least one negatively refracting spherically curved internal surface, said surfaces being all concentric with one another, said members including a biconvex member bounded by one of said outer surfaces and said internal surface and a concavo-convex member bounded by said internal surface and the other of said outer surfaces, said one of said outer surfaces having a radius of curvature of absolute length approximately equal to that of the radius of curvature of said other of said outer surfaces and substantially twice that of the radius of curvature of said internal surface.

5. A component as defined in claim 4 wherein said biconvex member has a refractive index of substantially 1.5, said concavo-convex member having a refractive index of substantially 1.75, the dispersion numbers of said concavo-convex member and said biconvex member being related to each other by a ratio of at least 2.48:1.

6. In an optical objective system, in combination, a collective lens of focal length $f$ and a field-flattening dispersive lens forwardly of said collective lens, said collective lens being bounded by concentric refractive surfaces of spherical curvature, said dispersive lens being symmetrical about an axis passing through the center of curvature of said collective lens and having a concave rear face turned toward said collective lens, said rear face being provided with an aspherical curvature of a configuration converting incident beams of parallel rays into diverging beams with axes substantially trained upon the center of said collective lens and with virtual foci spaced from said center by a distance $s$ substantially equal to $$\frac{kf}{k - \cos\theta}$$

$k$ being a constant equal to $s_0''/f$, where $s_0''$ is a distance greater than $f$, and $\theta$ being the angle of incidence with reference to said axis of symmetry of said dispersive lens, whereby said beams are refocused by said collective lens upon a substantially planar locus which lies beyond the latter at said distance $s_0''$ from said center of curvature.

7. The combination defined in claim 6 wherein said curvature osculates different hyperbolas at different points, all said hyperbolas having half-axes $a$, $b$ substantially satisfying the relationship $$\sqrt{a^2 + b^2} = an$$

wherein $n$ is the refractive index of said dispersive lens, each hyperbola having a focus substantially on a curve $$s = \frac{kf}{k - \cos\theta}$$

at the intersection of said curve with a straight line passing through the point of osculation between the hyperbola and said curvature and through the center of said collective lens.

8. The combination defined in claim 7 wherein said curve is so chosen that $k$ is substantially equal to $n$.

9. The combination defined in claim 8 wherein the distance between said rear face and said center along said axis of symmetry is substantially equal to $f$.

10. The combination defined in claim 6 wherein said dispersive lens has a spherically convex front face and a narrow internal gap of spherical curvature concentric with said front face.

11. In an optical objective system, in combination a collective lens of focal length $f$ and a field-flattening dispersive lens forwardly of said collective lens, said collective lens being bounded by refractive surfaces spherically curved about a common center, said dispersive lens being symmetrical about an axis passing through the center of curvature of said collective lens and having a concave rear face turned toward said collective lens, said rear face being provided with an aspherical curvature of a configuration converting incident beams of parallel rays into diverging beams with axes substantially trained upon said center, and with virtual foci spaced from said center by a distance $s$ substantially equal to $$\frac{kf}{k-\cos\theta}$$

$k$ being a constant equal to $s_0''/f$, where $s_0''$ is a distance greater than $f$, and $\theta$ being the angle of incidence with reference to said axis of symmetry of said dispersive lens, whereby said beams are refocused by said collective lens upon a substantially planar locus which lies beyond the latter at said distance $s_0''$ from said center of curvature, said refractive surface extending in at least one axial plane along arcs substantially smaller than the arc subtended by said rear face, said collective lens being rotatable relatively to said dispersive lens about a line passing through said center at right angles to said axial plane.

12. The combination defined in claim 11 wherein said dispersive lens has a front face which is substantially plane and perpendicular to said axis of symmetry.

13. The combination defined in claim 11 wherein said dispersive lens includes a rear member provided with said rear face and a front member of higher refractive index provided with a front face spherically curved about said center, said members adjoining each other along a spherically curved boundary concentric with said front face, the combined power of said front face and said boundary being substantially zero.

14. In combination, a collective lens with a spherical rear surface and a field-flattening lens following said collective lens, said field-flattening lens having substantially spherical front and rear surfaces concentric with the rear surface of said collective lens and defined in at least a median plane by concentric circular arcs, said field-flattening lens consisting at least in the vicinity of said rear surface of a transparent material with an index of refractivity increasing progressively from a relatively low value in said plane to a relatively high value at locations remote from said plane, the rate of variation of said refractive index and the curvature of said lens transverse to said plane being so chosen as to result in the projection of an image which is substantially flat in a direction transverse to said plane.

References Cited

UNITED STATES PATENTS

| | | | |
|---|---|---|---|
| 2,273,847 | 2/1942 | Eckel | 350—104 |
| 2,604,012 | 7/1952 | Taylor | 350—234 |
| 2,923,220 | 2/1960 | Bouwers | 350—198 X |

OTHER REFERENCES

Manual of Photogrammetry, 2nd Edition, 1952, pp. 29 and 30.

DAVID H. RUBIN, *Primary Examiner.*

JOHN K. CORBIN, JEWELL H. PEDERSEN,
*Examiners.*